United States Patent
Fraser et al.

(10) Patent No.: US 6,499,094 B1
(45) Date of Patent: Dec. 24, 2002

(54) MANAGEMENT OF MEMORY HEAP SPACE FOR DATA FILES ACCESSIBLE TO PROGRAMS OPERATING IN DIFFERENT ADDRESSING MODES

(75) Inventors: Paul A. Fraser, Apple Valley, MN (US); Thomas G. Kipp, Circle Pines, MN (US); Murray D. Wilke, Centerville, MN (US); William O. Pollnow, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/953,325

(22) Filed: Sep. 14, 2001

(51) Int. Cl.[7] .............................................. G06F 12/00
(52) U.S. Cl. ........................ 711/171; 711/170; 711/173; 711/5; 707/205
(58) Field of Search ................................ 711/171, 170, 711/172, 173, 5; 707/205, 100

(56) References Cited

U.S. PATENT DOCUMENTS

| | | | | |
|---|---|---|---|---|
| 5,561,786 A | * | 10/1996 | Morse | 707/205 |
| 5,566,321 A | * | 10/1996 | Pase et al. | 711/153 |
| 5,680,582 A | * | 10/1997 | Slayden | 711/171 |
| 5,787,447 A | * | 7/1998 | Smithline et al. | 707/206 |
| 5,809,554 A | * | 9/1998 | Benayon et al. | 707/205 |
| 6,115,782 A | * | 9/2000 | Wolczko et al. | 707/103 R |
| 6,131,150 A | * | 10/2000 | DeTreville | 711/170 |
| 6,154,823 A | * | 11/2000 | Benayon et al. | 711/170 |
| 6,199,075 B1 | * | 3/2001 | Ungar et al. | 707/10 |
| 6,249,852 B1 | * | 6/2001 | Benayon et al. | 711/170 |
| 6,317,816 B1 | * | 11/2001 | Loen | 707/103 R |
| 6,345,276 B1 | * | 2/2002 | Lee | 707/100 |
| 2001/0023478 A1 | * | 9/2001 | Ozawa et al. | 711/170 |
| 2002/0055929 A1 | * | 5/2002 | Kolodner et al. | 707/103 R |
| 2002/0056019 A1 | * | 5/2002 | Kolodner et al. | 711/6 |
| 2002/0095453 A1 | * | 7/2002 | Steensgaard | 709/107 |
| 2002/0099918 A1 | * | 7/2002 | Avner et al. | 711/170 |
| 2002/0120823 A1 | * | 8/2002 | Kolodner et al. | 711/170 |

FOREIGN PATENT DOCUMENTS

WO    WO 95/16957    *  6/1995

* cited by examiner

*Primary Examiner*—Hong Kim
(74) *Attorney, Agent, or Firm*—Charles A. Johnson; Mark T. Starr; Crawford Maunu, PLLC

(57) ABSTRACT

A method and apparatus for managing heap memory for an application program in a data processing system. The system supports a basic addressing mode and an extended addressing mode. Programs operating in the basic addressing mode are limited to addressing using a first number of bits, program operating in the extended addressing mode are limited to addressing using a second number of bits, and the first number of bits is less than the second number of bits. One or more heap banks are established for an application program, with each heap bank having a quantity of memory space that is addressable by the program operating in basic addressing mode. The heap banks are managed by a system program operating in extended addressing mode. In response to each request from the application program that requires a quantity of memory space, one of the heap banks is selected for allocating the memory. An additional heap bank is established if none of the heap banks has a quantity of available memory space that satisfies the required quantity.

14 Claims, 2 Drawing Sheets

MANAGEMENT OF MEMORY HEAP SPACE FOR DATA FILES ACCESSIBLE TO PROGRAMS OPERATING IN DIFFERENT ADDRESSING MODES

FIELD OF THE INVENTION

The present invention generally relates to memory management, and more particularly to using multiple heap data banks with reserved areas within the data banks.

BACKGROUND OF THE INVENTION

The number of concurrent activities that can be started and the number of files that can be opened by an application program are limited by some data processing systems because of the manner in which memory space is managed by the system. Some data processing systems allocate a heap memory bank of a certain size to an application. The heap bank is available for file input/output (I/O) and for use by activities started by the application. In one environment, for example, the USC C environment from Unisys, an activity is an executing part of a program and is sometimes referred to as a "task." The tasks or activities of a program generally execute concurrently. When the available space in the heap bank is exhausted, no additional files can be opened and no additional activities can be started by the application. Thus, in order to open a new file or start another activity, the application would need to wait for a file to be closed or an activity to complete. This limits the flexibility in developing applications.

One approach to dealing with the limited bank size is to increase the size of the heap bank for an application. However, the size of the heap bank may present addressing problems for some applications. For example, some systems, such as the Unisys 2200 series data processing systems, support applications with different addressing modes: "basic mode" is an 18-bit addressing architecture and "extended mode" is a 36-bit addressing architecture. If the size of a heap bank is increased beyond the limits of basic mode addressing, basic mode middleware would need to be modified to accommodate the increased address space, thereby incurring additional and perhaps unnecessary development expense.

A method and apparatus that addresses the aforementioned problems, as well as other related problems, are therefore desirable.

SUMMARY OF THE INVENTION

The invention provides a method and apparatus for managing heap memory for an application program in a data processing system. The system supports a basic addressing mode and an extended addressing mode. Programs operating in the basic addressing mode are limited to addressing using a first number of bits, program operating in the extended addressing mode are limited to addressing using a second number of bits, and the first number of bits is less than the second number of bits. One or more heap banks are established for an application program, with each heap bank having a quantity of memory space that is addressable by the program operating in basic addressing mode. The heap banks are managed by a system program operating in extended addressing mode. In response to each request from the application program that requires a quantity of memory space, one of the heap banks is selected for allocating the memory. An additional heap bank is established if none of the heap banks has a quantity of available memory space that satisfies the required quantity.

BRIEF DESCRIPTION OF THE DRAWINGS

Other aspects and advantages of the invention will become apparent upon review of the Detailed Description and upon reference to the drawings in which.

DETAILED DESCRIPTION

In the various embodiments set forth below, the invention manages heap memory for an application program in a data processing system that supports a first addressing mode and a second addressing mode. The first addressing mode addresses a smaller address space than the second addressing mode. The system provides one or more heap banks to an application, with each heap bank being addressable by a program operating in the first addressing mode. This provides applications with an address space that is larger than that available in the first addressing mode.

Figure 1:
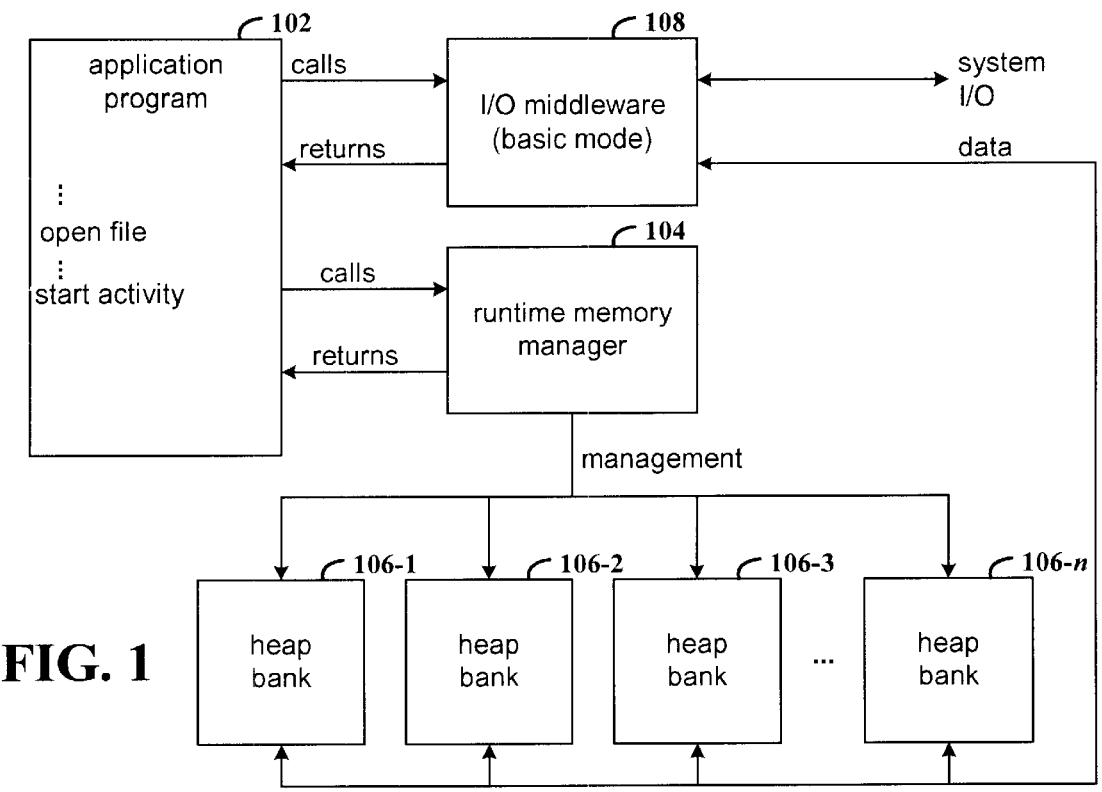
FIG. 1 is a functional block diagram of a system in which multiple heap data banks are allocated to an application program in accordance with one embodiment of the invention.

FIG. 1 is a functional block diagram of a system in which multiple heap data banks are allocated to an application program, in accordance with one embodiment of the invention. While "basic mode" and "extended mode" typically refer to specific numbers of address bits in Unisys systems, the terms are used more generally in this document to refer to addressing modes in which the basic mode addresses a smaller address space than does the extended mode.

Application program 102 operates in the extended addressing mode. The various operations performed by the example application program include opening files and starting activities. For each of these operations, some amount of heap memory space is required. For each operation, a call is made to runtime memory manager 104, which performs various management functions on heap banks 106-1–106-n. The management functions include, for example, allocation and deallocation of memory space. Each of heap banks 106-1–106-n is a size that permits addressing in either basic mode or extended mode.

In one embodiment, runtime memory manager 104 returns to the application program a status code and a virtual address that references a file information packet (FIP) in response to a request to open a file. In another embodiment, the FIP is stored in a data bank (not shown) known to the application program. The FIP references the appropriate one of heap banks 106–106-n for the associated file.

For a read or write operation on a file, the application program provides the FIP to the runtime memory manager. The runtime memory manager determines which heap bank to acquire for the tables, buffers, or record area before calling the I/O middleware 108. I/O middleware 108 is system provided software that interacts with the operating system to perform data input and output functions. The I/O middleware accesses heap banks 106-1–106-n, via pointers provided by runtime memory manager 104, for the input and output of data. Since each individual heap bank is addressable in basic mode, the total memory space provided in all the heap banks is addressable by a basic mode program, for example, the I/O middleware. Thus, prior generations I/O middleware operating in basic mode are compatible with new applications that require a large number of open files (relative to that provided for in prior generations of computing systems). In starting a new activity, the runtime memory manager acquires memory from the next available space within the heap bank. Once that activity requests a file to be opened, all related I/O interface data must come from the same heap bank.

The manner in which the I/O middleware operates with basic mode addressing is further described with reference to a particular implementation, for example, Unisys 2200 series data processing systems. An extended mode virtual address is 36 bits (L/BDI/OFFSET), and a basic mode address is 18 bits (OFFSET). A program using basic mode addressing is responsible for basing the correct bank (L/BDI) on the basic mode base register set (referenced as B12–B15). A basic mode instruction does not specify a base register, but an extended mode instruction does. For example, a basic mode instruction is "SA A1,TAG", and an extended mode instruction that performs the same operation is "SA A1,TAG,B2". In the basic mode instruction, the contents of register A1 are stored into offset TAG, which was previously based on one of the basic mode base registers (i.e., B14). The extended mode instruction stores the contents of register A1 into offset TAG using base register B2 (L/BDI) for the base address.

Figure 2:
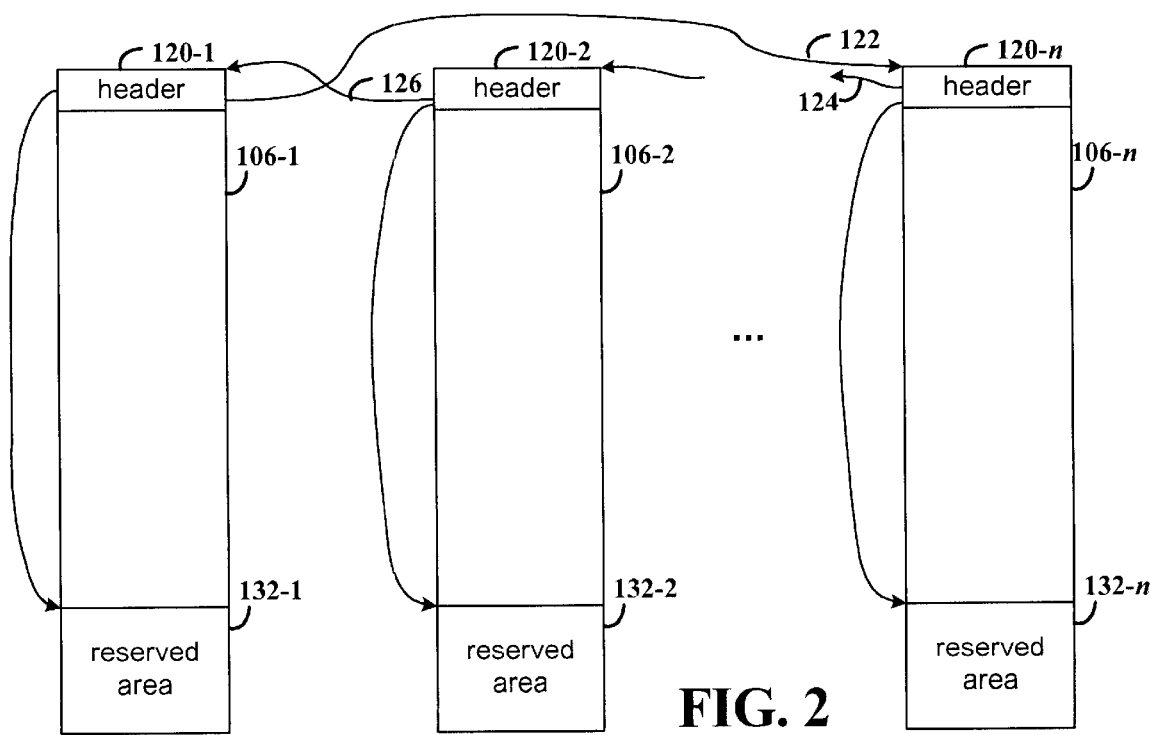
FIG. 2 is a block diagram that illustrates how the runtime memory manager manages multiple heap banks.

FIG. 2 is a block diagram that illustrates how the runtime memory manager manages multiple heap banks. Each of heap banks 106-1–106-n includes a respective header 120-1–120-n. Each header is used to link the heap bank in the chain of heap banks and to point to a reserved area within the heap bank. The header also includes information such as the location of the next and last available locations in the heap bank, locks on the heap bank, current maximum offset, absolute maximum offset, reserved area size, and head and tail pointers to the first and last available blocks within the heap bank.

The heap banks are managed as a linked list, with the linking pointers stored in the headers of the heap banks. The first heap bank in the list is heap bank 106-1, and heap bank 106-n is the last in the list. The pointers are managed to support the manner in which memory space is sought for allocation. Memory space is sought beginning with the last heap bank in the list. Thus, header 120-1 in the first heap bank has pointer 122 to the last heap bank 106-n. Header 120-n has pointer 124 to heap bank 106-(n–1) (not shown). The linked list continues through header 120-2 having pointer 126 to heap bank 106-1.

The heap banks 106-1–106-n have respective reserved areas 132-1–132-n that are considered for satisfying a memory request when an application identifies a particular heap bank in the allocation request. When a particular heap bank is requested and the heap bank does not have enough space (without considering the reserve area) available to satisfy the request, the runtime memory manager checks whether there is sufficient space in the heap bank, considering also the space available in the reserved area. The header in each heap bank includes a pointer to the reserved area in the heap bank.

Since the runtime memory manager generally allocates heap bank space as allocation requests are submitted, an activity may have space allocated in several different heap banks. However, from a performance standpoint it may be desirable for the activity to have certain file space consolidated in a single heap bank. The reserved areas are provided so that activities have space available in a single heap bank if it is required. In one embodiment, the size of the reserved area is specified as a parameter to the compiler when the application program is compiled.

Figure 3:
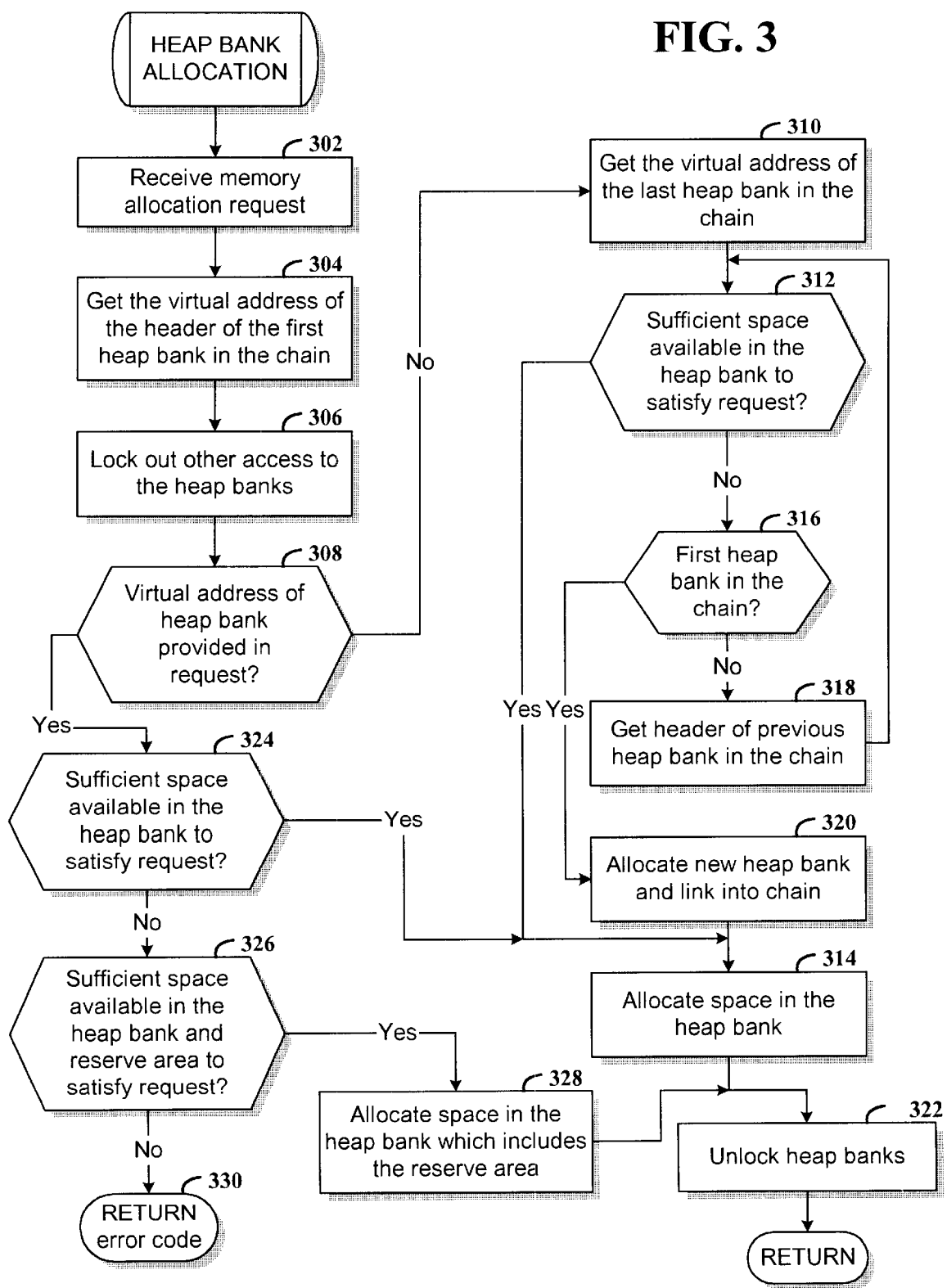
FIG. 3 is a flowchart of an example process for allocating heap bank memory space.

FIG. 3 is a flowchart of an example process for allocating heap bank memory space. The process begins at step 302 where the runtime memory manager receives an allocation request from an application program. At step 304, the virtual address of the first heap bank in the chain of heap banks is obtained. The first heap bank is created when the program is started. At step 306, the process locks out access by other activities to the chain of heap banks while space is sought to satisfy the allocation request. Decision step checks whether a particular heap bank is specified (by virtual address) in the allocation request. If not, the process continues at step 310. At step 310, the process obtains from the header of the first heap bank the virtual address of the last heap bank in the chain of heap banks. At decision step 312, the process checks whether the heap bank has sufficient space to satisfy the allocation request (without considering the reserved space). If there is space available, the process is directed to step 314 where the space is allocated in the heap bank. If the heap bank does not have sufficient space, decision step 312 directs the process to decision step 316.

Decision step 316 determines whether the heap bank under consideration is the first heap bank in the chain. If not, at step 318 the process gets the address of the previous heap bank in the chain from the header of the current heap bank and returns control to decision step 312 where the previous heap bank is examined. If the process reaches the first heap bank in the chain without finding sufficient memory space, decision step 316 directs the process to step 320 where a new heap bank is allocated and linked into the chain. Space is then allocated in the new heap bank at step 314.

If the allocation request specifies a particular heap bank, decision step 308 directs the process to decision step 324, which determines whether there is sufficient space in the specified heap bank. If space is available, the space is allocated at step 314. Otherwise, the process continues at decision step 326. Decision step 326 determines whether there is sufficient space in the specified heap bank, including the reserved area, to satisfy the allocation request. If so, at step 328 space is allocated in the heap bank and the included reserved area.

Once space is allocated, the process continues at step 322 where the heap banks are unlocked and control is returned to the calling program. If the allocation request specifies a particular heap bank and there is insufficient space in the heap bank, including the reserved area, an error code is returned to the calling program at step 330.

Accordingly, the present invention provides, among other aspects, a system and method for managing heap memory space for a program. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for managing heap memory for an application program in a data processing system that supports a first addressing mode and a second addressing mode, wherein a program operating in the first addressing mode is limited to addressing using a first number of bits, a program operating in the second addressing mode is limited to addressing using a second number of bits, and the first number of bits is less than the second number of bits, comprising:

establishing one or more heap banks, each with a quantity of memory space that is addressable by a program operating in the first addressing mode;

managing the one or more heap banks with a system program operating in the second addressing mode;

responsive to each request from the application program that requires a quantity of memory space:

allocating memory space to the application program in a selected one of the heap banks that has a quantity of available memory space that satisfies the required quantity; and establishing an additional heap bank if none of the heap banks has a quantity of available memory space that satisfies the required quantity and allocating memory space to the application program in the additional heap bank.

2. The method of claim 1, further comprising:

establishing a reserved area within each of the heap banks; and in response to selected ones of the requests, using the reserved area within a heap bank to determine whether the heap bank has available memory space to satisfy the quantity of required memory space; and allocating memory space in the reserved area to the application program if the heap bank has sufficient available memory space.

3. The method of claim 2, wherein each of the selected ones of the requests include specifies a particular one of the heap banks.

4. The method of claim 3, further comprising establishing each reserve area with a selected size in response to a reserved-area input parameter input at compilation of the application program.

5. The method of claim 3, further comprising linking the heap banks in a chain.

6. The method of claim 5, further comprising:

linking a last one of the heap banks in the chain to a first one of the heap banks in the chain; and in selecting one of the heap banks in the chain for allocating memory, first evaluating the last heap bank in the chain.

7. The method of claim 1, further comprising linking the heap banks in a chain.

8. The method of claim 7, further comprising:

linking a last one of the heap banks in the chain to a first one of the heap banks in the chain; and in selecting one of the heap banks in the chain for allocating memory, first evaluating the last heap bank in the chain.

9. The method of claim 3, wherein the request is an open-file request.

10. The method of claim 3, wherein the request is start-activity request.

11. The method of claim 1, wherein the request is an open-file request.

12. The method of claim 1, wherein the request is start-activity request.

13. The method of claim 1, wherein the data processing system further includes an input-output program operating in the first addressing mode, and further comprising inputting and outputting data by the application program to a selected one of the heap banks via the input-output program.

14. An apparatus for managing heap memory for an application program in a data processing system that supports a first addressing mode and a second addressing mode, wherein a program operating in the first addressing mode is limited to addressing using a first number of bits, a program operating in the second addressing mode is limited to addressing using a second number of bits, and the first number of bits is less than the second number of bits, comprising:

means for establishing one or more heap banks, each with a quantity of memory space that is addressable by a program operating in the first addressing mode;

means for managing the one or more heap banks with a system program operating in the second addressing mode;

means, responsive to each request from the application program that requires a quantity of memory space, for allocating memory space to the application program in a selected one of the heap banks that has a quantity of available memory space that satisfies the required quantity; and means for establishing an additional heap bank if none of the heap banks has a quantity of available memory space that satisfies the required quantity and allocating memory space to the application program in the additional heap bank.

\* \* \* \* \*